US012485696B1

(12) United States Patent
Vaca

(10) Patent No.: US 12,485,696 B1
(45) Date of Patent: Dec. 2, 2025

(54) INFLATABLE GARLAND

(71) Applicant: Emily Catherine Vaca, Chicago, IL (US)

(72) Inventor: Emily Catherine Vaca, Chicago, IL (US)

( * ) Notice: Subject to any disclaimer, the term of this patent is extended or adjusted under 35 U.S.C. 154(b) by 0 days.

(21) Appl. No.: 19/039,503

(22) Filed: Jan. 28, 2025

Related U.S. Application Data

(60) Provisional application No. 63/655,677, filed on Jun. 4, 2024.

(51) Int. Cl.
*B44C 5/06* (2006.01)
*A41G 1/04* (2006.01)
*A63H 27/10* (2006.01)

(52) U.S. Cl.
CPC .................. *B44C 5/06* (2013.01); *A41G 1/04* (2013.01); *A63H 27/10* (2013.01); *A63H 2027/1041* (2013.01); *A63H 2027/1075* (2013.01)

(58) Field of Classification Search
CPC ................ A63H 27/10; A63H 27/1041; A63H 27/1075; A63H 27/1083
USPC ......................... 446/220, 221, 222, 223, 226
See application file for complete search history.

(56) References Cited

U.S. PATENT DOCUMENTS 2,731,768 A * 1/1956 Harrowe .................. A63H 3/06 285/200
3,229,976 A * 1/1966 Allen, Jr. ............... A63B 43/06 362/253
3,230,663 A 1/1966 Shabram
3,358,398 A * 12/1967 Chalfin ..................... G09F 7/06 40/214
4,179,832 A * 12/1979 Lemelson ................. F21S 2/00 40/550
4,758,199 A * 7/1988 Tillotson ................ A63H 27/10 244/31
4,850,926 A * 7/1989 Lovik .................... A63H 27/10 446/222
4,892,500 A 1/1990 Lau
4,895,546 A * 1/1990 Rakonjac ................. A63H 3/46 446/221
4,934,986 A * 6/1990 Wallace ................. A63H 27/10 446/222
5,098,329 A * 3/1992 Tseng ..................... A63H 27/10 473/610

(Continued)

*Primary Examiner* — Joseph B Baldori
(74) *Attorney, Agent, or Firm* — Carmody MacDonald P.C.; Dennis Jm Donahue, III; Kevin C. Staed

(57) ABSTRACT

A balloon garland has multiple interconnected balloon chambers in which the balloon chambers are asymmetric with each other in the inflated state and are substantially flattened when the balloon chambers are in a deflated state. In the inflated state, the interconnected balloon chambers have tangential connections that are located in different planes with axes that form skew lines that do not intersect and are not parallel. The axes of these planes are substantially parallel to each other and are substantially perpendicular to the planar configuration of the balloon chambers when they are in the deflated state. There is a single port in one of the balloon chambers, and a valve is connected to and in fluid communication with the port. A flow of gas is allowed through the port in the valve's open configuration, the valve prevents a flow of the gas through the port in its closed configuration.

20 Claims, 11 Drawing Sheets

(56) References Cited

U.S. PATENT DOCUMENTS

| | | | | | |
|---|---|---|---|---|---|
| 5,119,842 | A * | 6/1992 | Jaw | F16K 15/1825 137/232 |
| 5,343,889 | A * | 9/1994 | Jaw | F16K 15/205 137/232 |
| 5,522,757 | A * | 6/1996 | Ostrowski | A63B 43/02 473/576 |
| 5,769,685 | A | 6/1998 | Nakamura et al. | |
| 6,019,660 | A | 2/2000 | Luciano | |
| 6,332,823 | B1 | 12/2001 | Rouse | |
| 6,575,805 | B1 | 6/2003 | Ansolabehere et al. | |
| 6,758,715 | B2 * | 7/2004 | Banks | A63H 27/10 446/221 |
| 7,491,109 | B2 | 2/2009 | Rouse | |
| 7,611,395 | B2 * | 11/2009 | Bonsembiante | A63H 27/10 362/253 |
| 9,113,724 | B1 | 8/2015 | Heining et al. | |
| 9,474,984 | B1 * | 10/2016 | Yabe | A63H 3/06 |
| 10,704,761 | B1 * | 7/2020 | Zhu | F21V 19/00 |
| 11,167,220 | B2 * | 11/2021 | Sifferlin | A63H 27/10 |
| 2004/0063380 | A1 * | 4/2004 | Chi | A63H 33/046 446/220 |
| 2007/0249259 | A1 * | 10/2007 | Pham | A63H 33/22 446/224 |
| 2008/0276545 | A1 | 11/2008 | Publicover et al. | |
| 2011/0212664 | A1 * | 9/2011 | Chen | A63H 33/00 446/220 |
| 2017/0144077 | A1 | 5/2017 | Wicken et al. | |

* cited by examiner

INFLATABLE GARLAND

CROSS-REFERENCE TO RELATED APPLICATIONS

This application claims priority from U.S. Provisional Pat. App. Ser. No. 63/655,677 filed on Jun. 4, 2024.

BACKGROUND OF THE INVENTION

Field of the Invention

The present invention relates to inflatable structures, and more particularly to inflatable garlands made from multiple balloon chambers which have interior spaces that are in fluid communication with each other.

Related Art

There are many known inventions for balloon garland inventions which have multiple balloon chambers that are fixedly attached to each other with interior spaces that are in fluid communication with each other. These known balloon garland structures are particularly helpful in decorating a space because they have a single port with a valve that can be used to simultaneously inflate all of the balloon chambers. These interconnected balloon garland structures are an improvement over prior balloon garland structures had required each balloon chamber to be separately inflated and either connected to each other through separate connecting tubes or tied off separately and then the balloons could be connected to each other or to a stand.

There is a common manufacturing process that is used for most prior art interconnected balloon chambers which results in the same structural limitation. The balloons assemblies disclosed in U.S. Pat. Nos. 6,332,823, 6,575,805, 5,769,685, and 7,491,109 are formed by two (2) sheets of gas-impervious material that are sealed at their peripheral seams and which have air passageways between the balloon chambers. This manufacturing method necessarily limits the central axes of the air passageways to being within the same horizontal plane as the balloon chambers when they are deflated. In particular, in these interconnected balloon chambers, the central axis of each air passageway between the balloon passageways remains in the horizontal plane. Accordingly, when air or some other gas is used to inflate the balloon chambers, the chambers expand the sides of the gas-impervious sheets so the balloon chambers remain symmetric to their deflated state. In order to change the orientation of adjacent balloon chambers relative to each other and give the balloon arrangement a more decorative appearance, a person must externally manipulate the balloon chambers relative to each other. In these known interconnected balloon chambers, the gas cannot force the balloon chambers into an asymmetric arrangement relative to each other.

The prior art balloon assemblies which allow for off-center, asymmetric connections between balloons typically use separate plugs and passageways as the interconnections between the balloon chambers, such as in U.S. Pat. No. 4,892,500 and US Pat. App. Pub. No. 2008/0276545, or between balloons and a stand and other structures, such as in US Pat. App. Pub. Nos. 2017/0144077 and 2008/0276545, respectively. Again, in order for these balloons to be arranged in an asymmetric arrangement, a person must externally manipulate the balloon chambers relative to each other, such as by varying the connection and plug locations, or relative to the structure.

There remains a need for interconnected balloon chambers in which the air or gas that fills the chambers to naturally force the balloon chambers into a predefined asymmetric arrangement so there is no need to externally manipulate the balloons relative to each other or to arrange them individually or as a group on some other structure.

SUMMARY OF THE INVENTION

The inflatable garland described herein is a balloon garland with interconnected balloon chambers formed by panels of a gas-impervious material in which the structure and configuration of the apertures between the balloon chambers use the pressure of the air or other gas to naturally force the balloon chambers into an asymmetric arrangement in the inflated state.

In another aspect of the invention, the apertures in the balloon structures are located within tangential connections between the exterior surface of respective pairs of balloon chambers. The tangential connections are in a fixed orientation without any tube or other extension between the balloon chambers, and it is the pressure of the air or other gas that forces the balloon chambers into their predefined asymmetric orientation relative to each other.

In yet another aspect of the invention, one or more of the balloon chambers can include fasteners connected to the exterior surface of the balloon chambers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
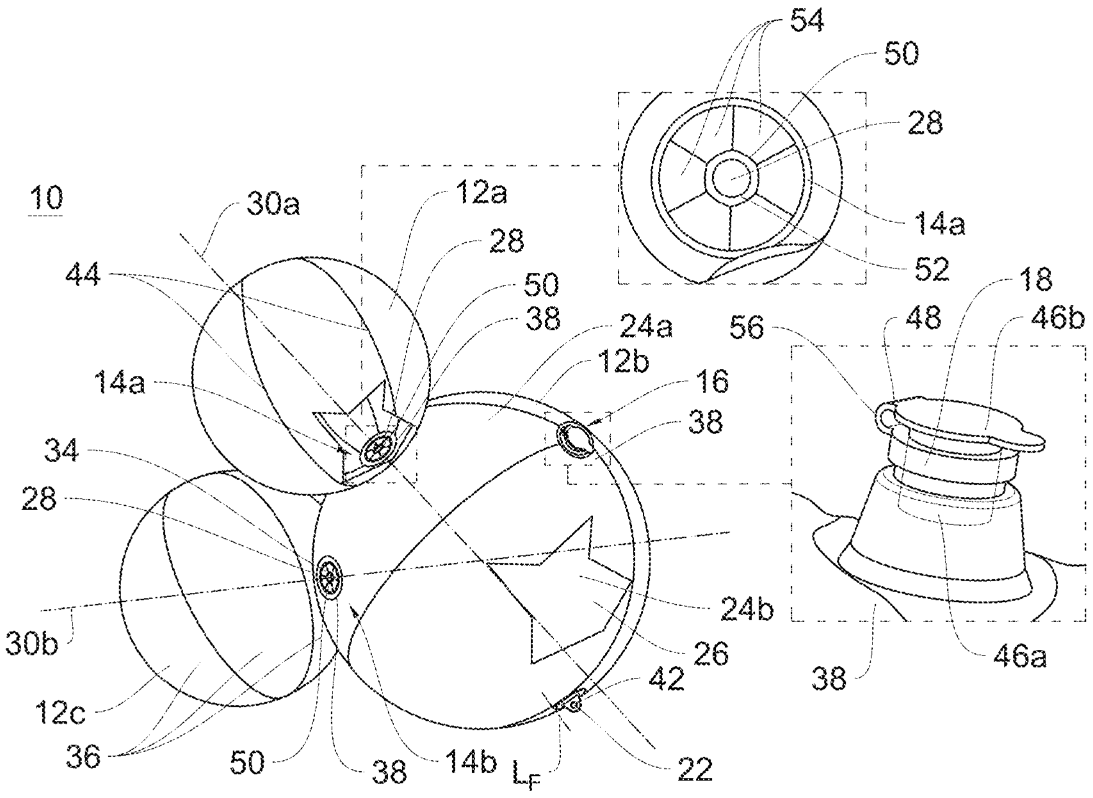
FIGS. 1A and 1B show a first embodiment of an inflatable garland in an inflated state and a deflated state, respectively, according to the invention described herein.
Figure 1B:
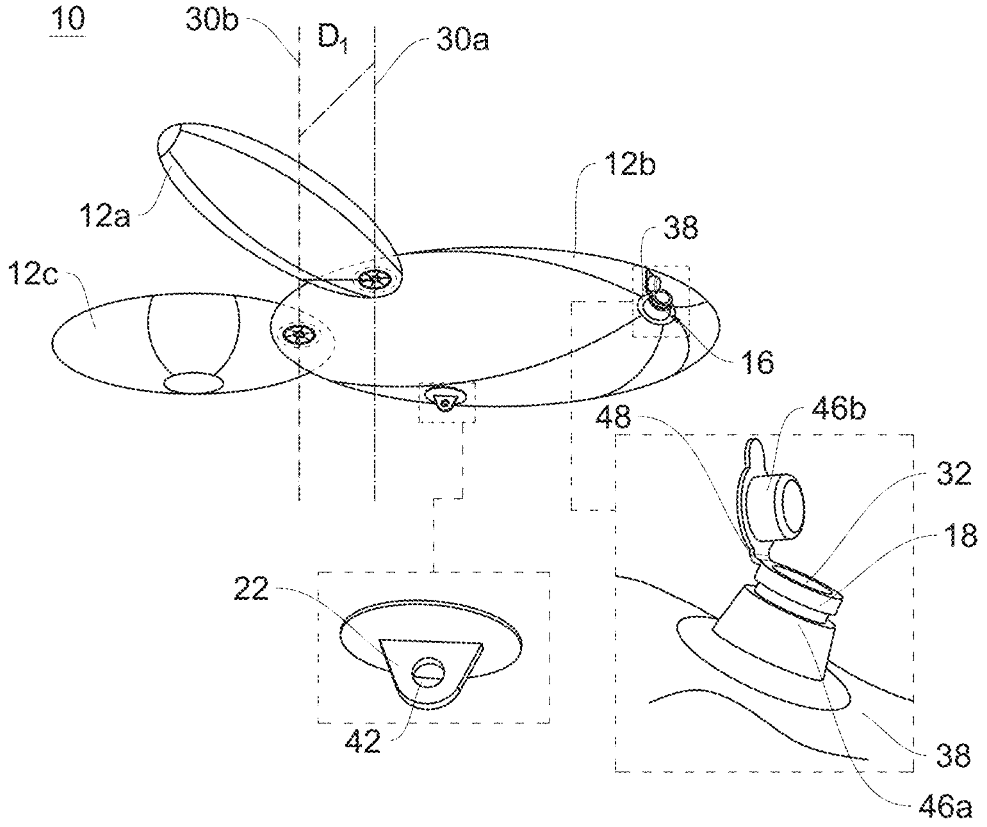
Figure 2A:
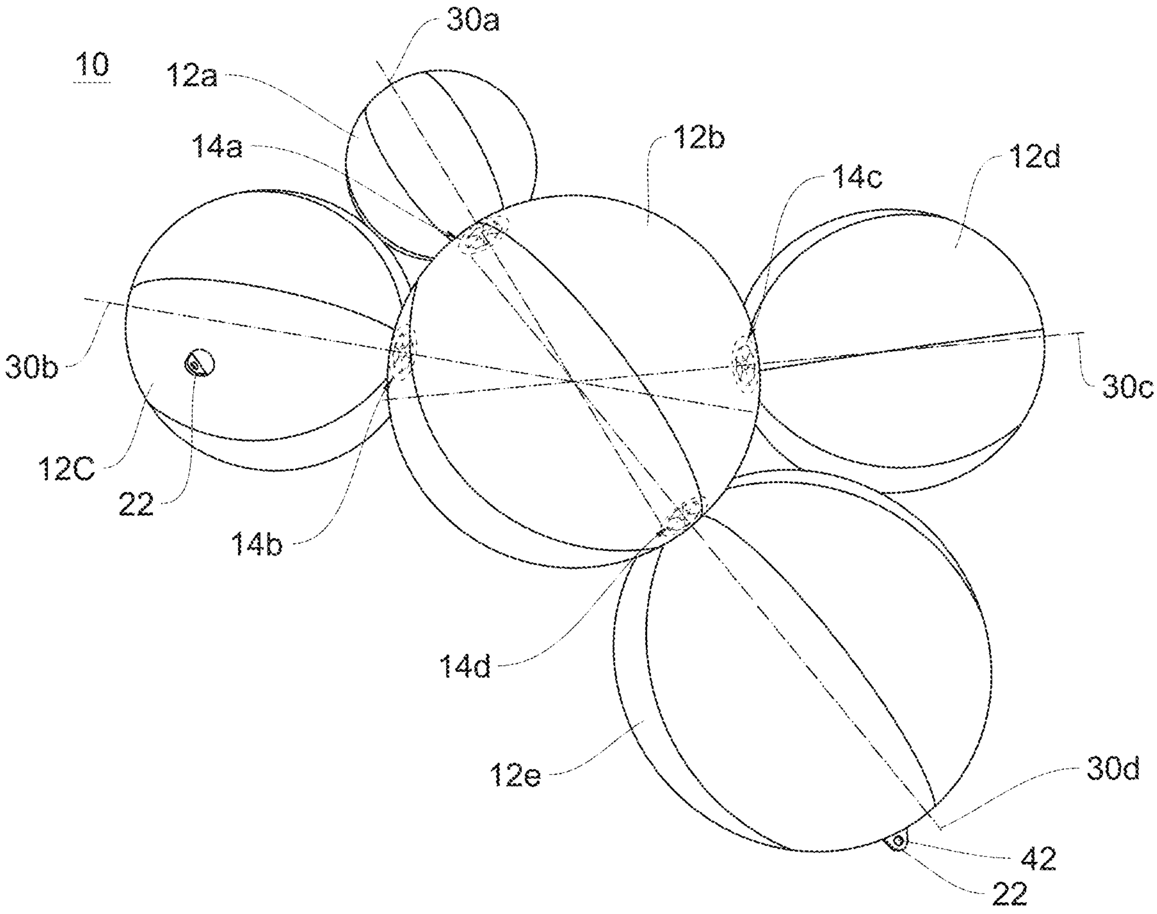
FIGS. 2A and 2B show a second embodiment of an inflatable garland in an inflated state and a deflated state, respectively.
Figure 2B:
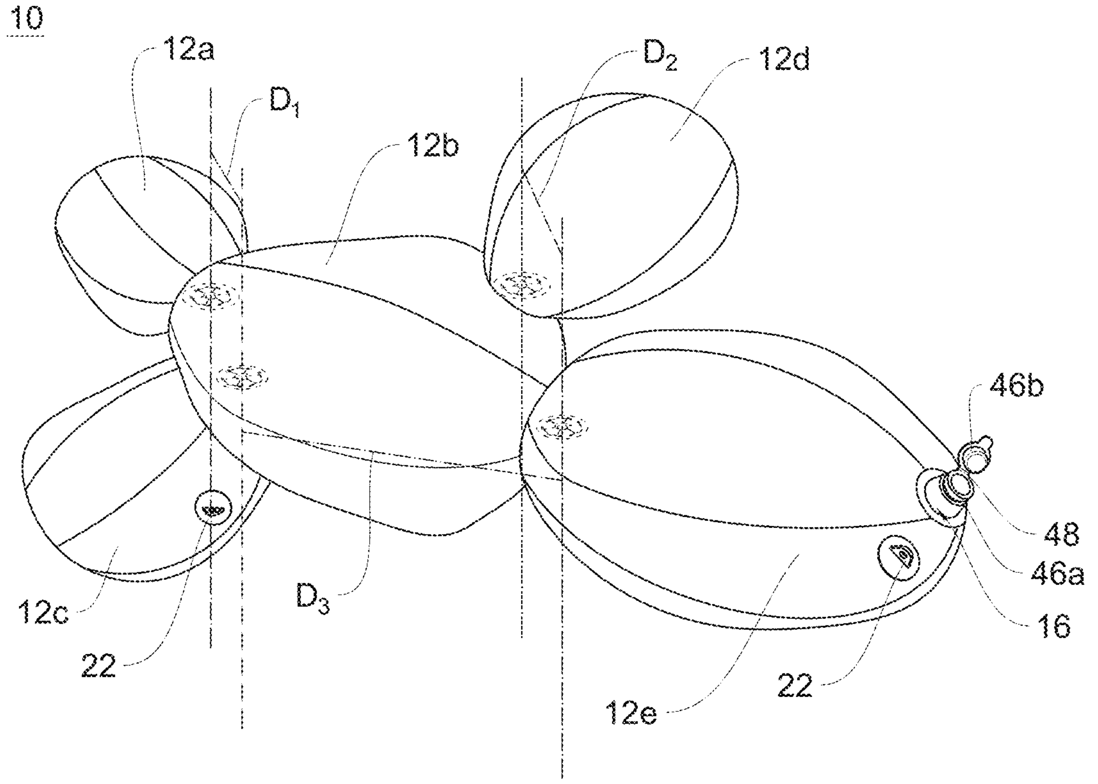
Figure 3A:
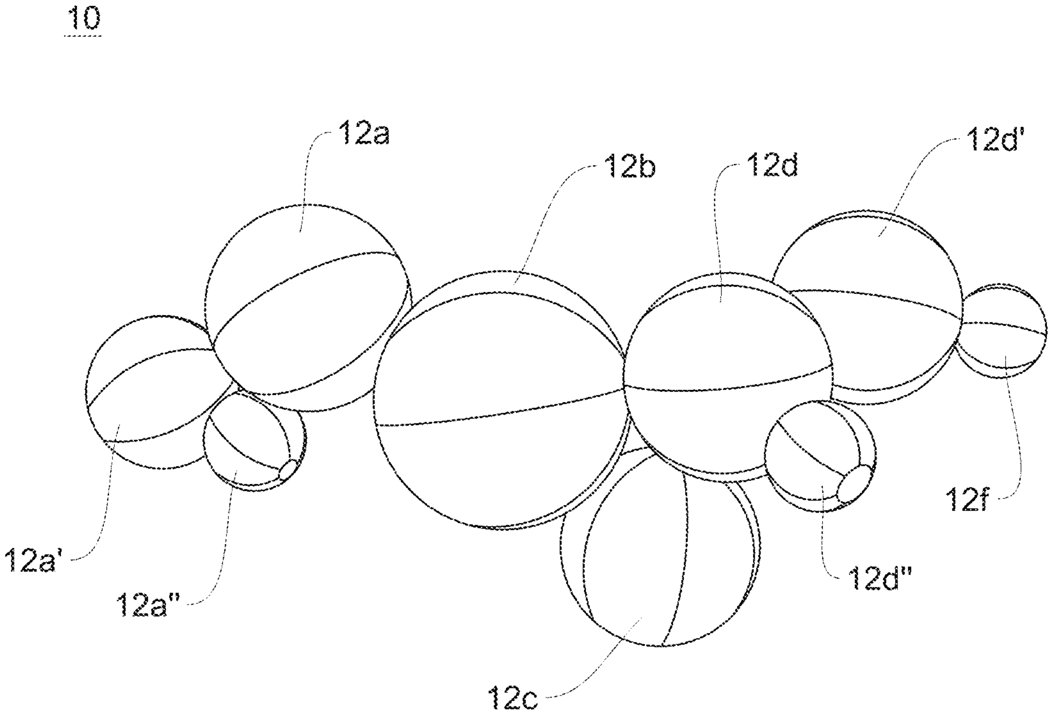
FIGS. 3A-3F show a third embodiment of an inflatable garland according to the invention described herein.
Figure 3B:
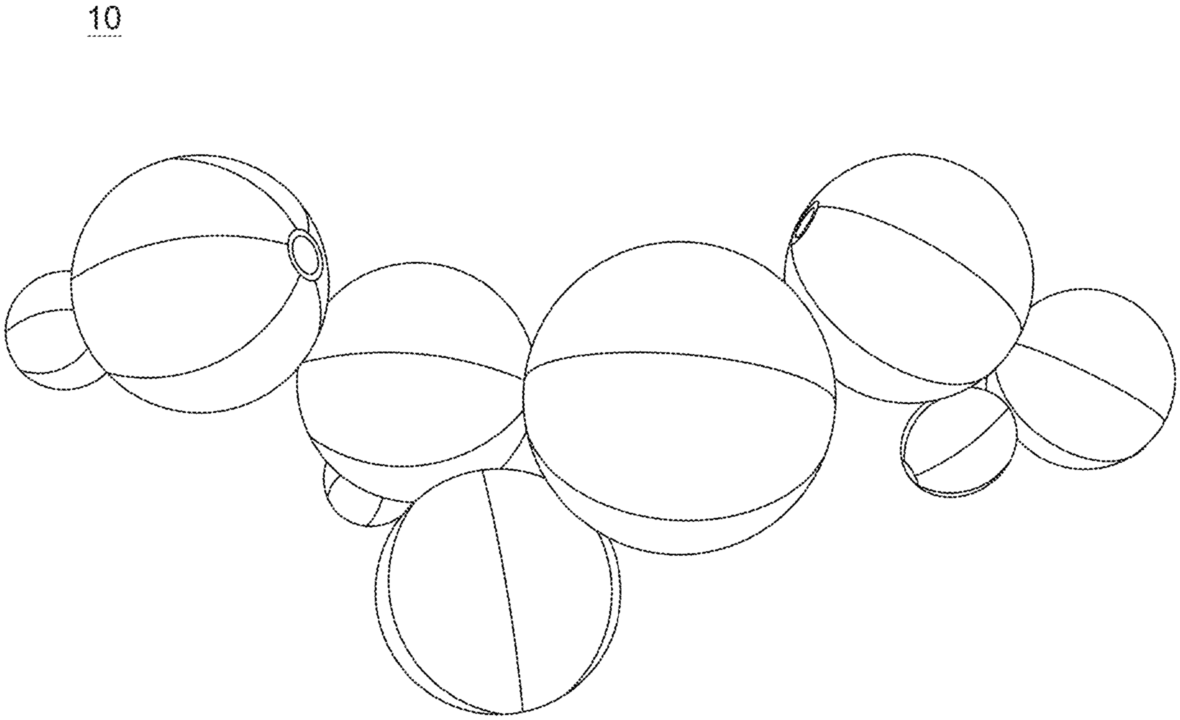
Figure 3C:
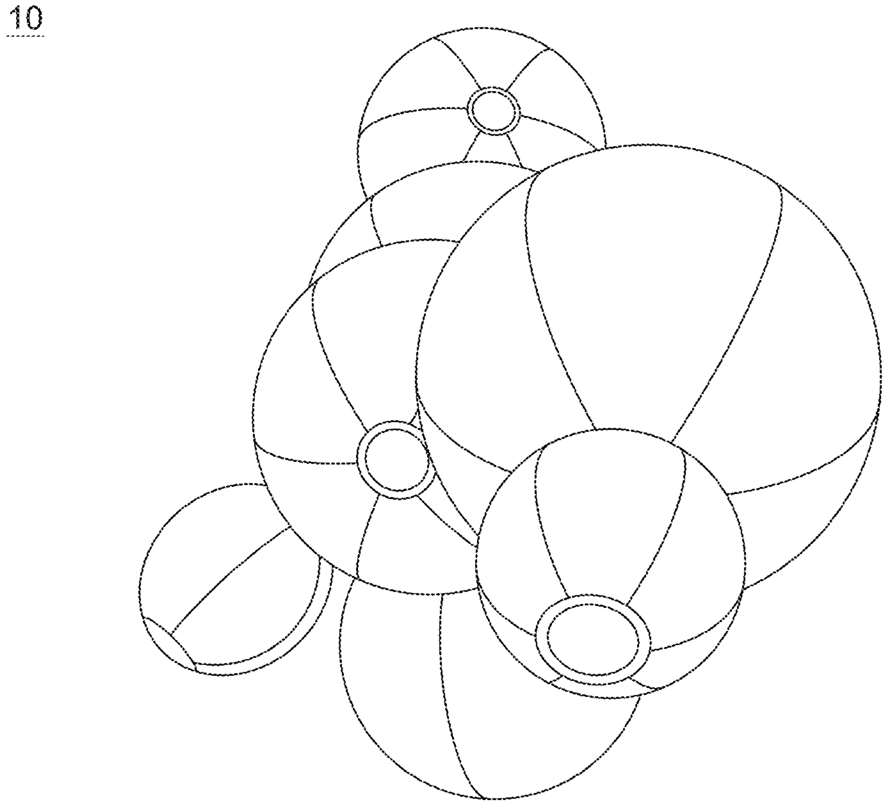
Figure 3D:
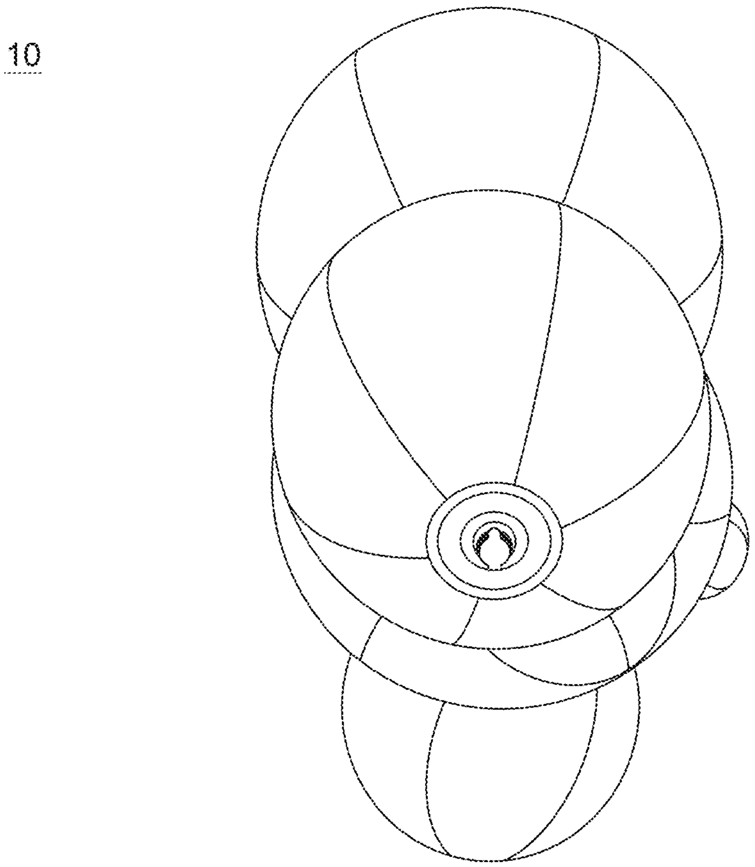
Figure 3E:
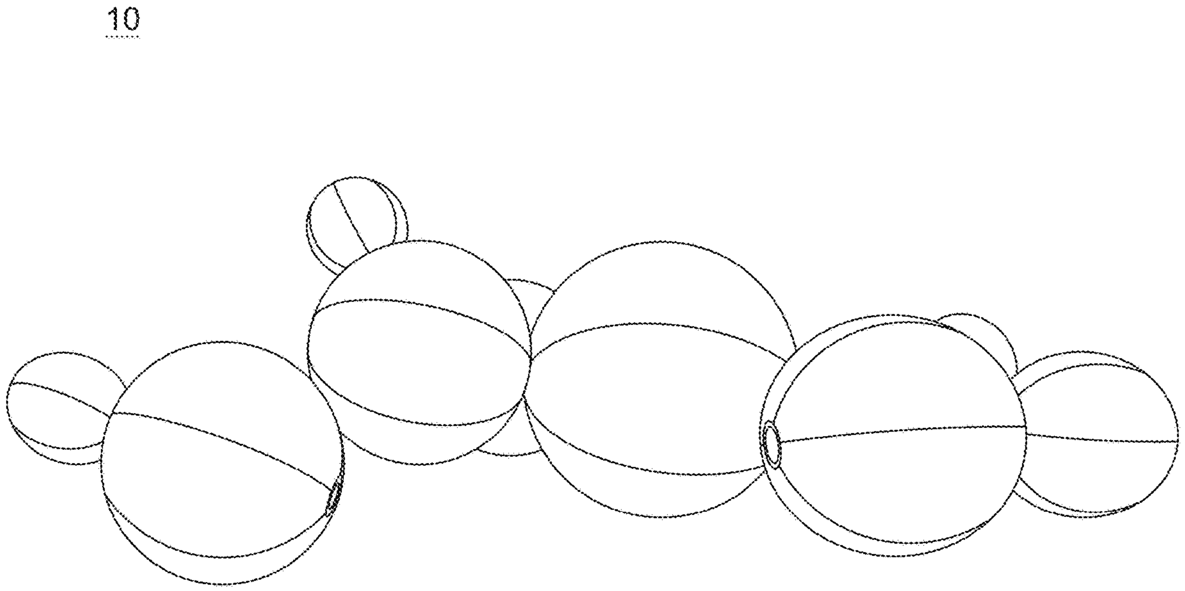
Figure 3F:
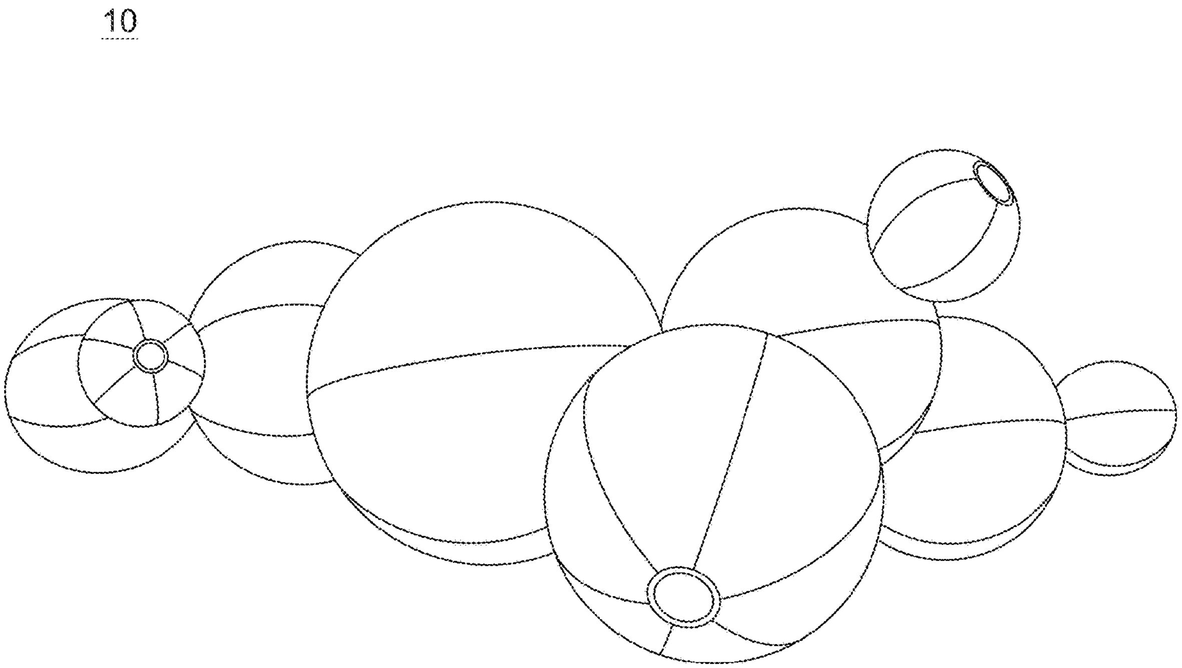

The inflatable balloon garland 10 of the present invention is formed by multiple balloon chambers 12*a*, 12*b*, 12*c*, 12*d*, 12*e* made from a flexible gas-impervious material 24 and which have an inflated state as shown in FIGS. 1A, 2A, and 3A-3F—and a deflated state as shown in FIGS. 1B and 2B. In the inflated state, the balloon chambers are forced into an asymmetric arrangement by the pressure of a gas within the chambers according to the configuration and locations of heat welded tangential connections 14*a*, 14*b*, 14*c*, 14*d* that attach the chambers to each other. In the deflated state, the balloon chambers are substantially flattened into a planar configuration. Each one of the balloon chambers are preferably formed by several elongated panels 36 of the flexible gas-impervious material that are heat welded and sealed together with longitudinal seams 44 at the respective boundaries between adjacent elongated panels. In particular, there are several panels that increase in width from their end sections to their middle section, and the end sections are heat welded and sealed with a circular panel 38 on at least the side of the balloon chambers that are opposite side from the tangential connection, i.e., distal from the tangential connection.

The balloon garland is formed by pairs of balloon chambers 12*a*/12*b*, 12*b*/12*c* that are attached to a shared balloon chamber 12*b*. Each balloon chamber comprises an exterior surface 24*a* and an interior surface 24*b*. The interior surface surrounds an internal space 26 when the balloon chambers are in the inflated state and is substantially flattened into the planar configuration when the balloon chambers are in the deflated state. The balloon chambers are fixedly attached to each other by tangential connections 14*a*, 14*b*, 14*c*, 14*d* between each of the pairs of balloon chambers. At the tangential connections, the panels of the corresponding balloon chambers have apertures 28 that align with each other and allow for airflow between the chambers. As explained in more detail below, when the balloon chambers are in their inflated state, the tangential connection between one pair of balloon chambers is located in a first plane while the tangential connection between another pair of balloon chambers is located in another plane.

It will be appreciated that the exterior surface of the pairs of balloon chambers can directly attach to each other in a fixed orientation at the respective tangential connections without any tube or other extension between the balloon chambers. Preferably, as shown in FIGS. 1A and 1B, in each pair of balloon chambers, the end of the balloon chamber opposite from the circular panel in one balloon chamber, i.e., where the end sections of the elongated panels are located, is heat welded to the side panel of the other balloon chamber in the pair. The end sections have terminal ends 54 that surround an open space 50 in the balloon chamber, and a hole 52 is cut into the elongated panel of the other balloon chamber to form the apertures that are aligned between the balloon chambers. In the inflated state of the balloon chambers, the axis 30*a* that extends through one tangential connection is perpendicular to the first plane while another axis 30*b* that extends through the other tangential connection is perpendicular to the second plane which produces the asymmetry between the balloon chambers that form the balloon garland's structure. The first axis and the second axis form skew lines that do not intersect and are not parallel when the balloon chambers are in their inflated state. Even when the balloon chambers are spherical and are tangentially connected to the shared balloon chamber, the pull of gravity on the inflated balloon chambers in their asymmetric arrangement results in the skew lines for the axes.

Figure 1C:
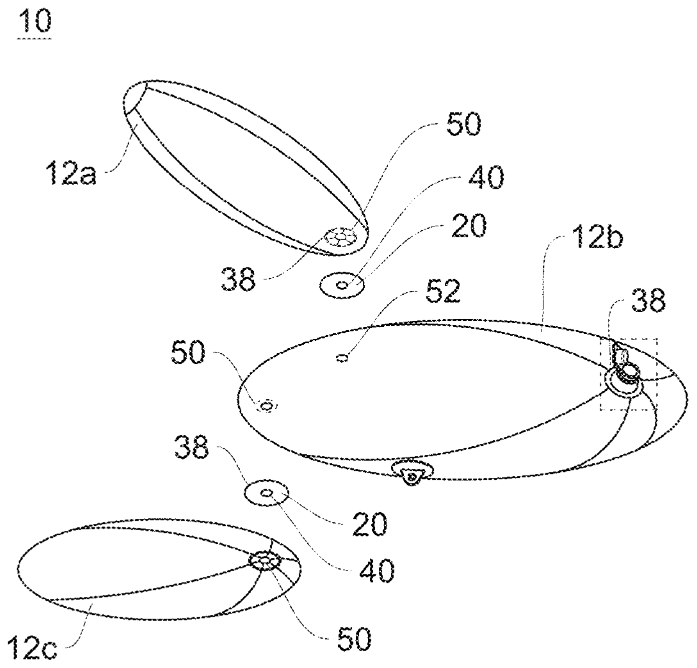
FIG. 1C shows an exploded view of the first embodiment of the inflatable garland.

Optionally, as shown in FIG. 1C, a connecting ring 20 can be sandwiched between the exterior surface of the pairs of balloon chambers to provide additional structural support to the balloon chambers' panels at each tangential connection. The connecting ring and the balloon chambers' panels are preferably connected with heat welding. The center space 40 of the connecting ring surrounds the apertures in the corresponding pair of balloon chambers which provides an internal fluid passageway 34 allowing an unencumbered airflow between the respective internal spaces in each of the balloon chambers. As shown in one of the balloon chambers 12*c* in FIG. 1C, when the open spaces 50 between the end sections of the elongated panels are aligned between a pair of balloon chambers 12*b*/12*c*, the circular panel 38 that seals one of the elongated panels can be provided with a center space or cut with a hole as described above with respect to the elongated panel to serve as the connecting ring 20.

A port 16 in one of the balloon chambers has an external fluid passageway 32 between the interior surface and the exterior surface, and there is a valve 18 connected to and in fluid communication with the port. The valve allows a flow of the gas through the port in an open configuration and prevents a flow of the gas through the port in a closed configuration. The valve can be any type of air valve which has a housing 46*a* with an opening and a plug 46*b* that is securely seated within or over the opening in the closed configuration, such as shown in FIGS. 1A and 2A, and is spaced away from the opening in the open configuration, such as shown in FIGS. 1B and 2B. The housing is preferably flexible and can be pushed into the interior of the balloon chamber resulting in the plug being substantially flush with the exterior surface as shown in FIG. 1A. As shown in the detail views of FIGS. 1A and 1B, the housing can extend outward from the balloon chamber's exterior surface when inflating and deflating the balloon garland. The port is preferably located in the circular panel rather than in one of the elongated panels. The opening in the housing may also include a one-way check valve (not shown) which prevents air from escaping out from the balloon chambers through the valve unless the check valve is opened, such as with an open tube that is placed in the check valve to keep it open or when the housing is flexible and is squeezed slightly to deform the housing's circular shape and open the check valve. Preferably the plug is connected to the housing through a tether 48, and the tether forms a loop 56 when the plug is seated in the closed configuration.

Each balloon chamber preferably has a squat configuration when inflated with lateral dimensions of each balloon chamber being within the same order of magnitude as a longest longitudinal dimension of each respective balloon chamber. The balloon chambers preferably not elongated or spindly (i.e., long and thin having a tubular shape with a length that is more than an order of magnitude greater than the radius of the tube's circular cross-section), although the present invention could be applied to such elongated and spindly balloon chambers as well as all different shapes of balloon chambers. Generally, squat balloon chambers have lateral dimensions that are each within the same order of magnitude as the longest longitudinal dimension. Although the balloon chambers in the preferred embodiment are spherical in shape, with lateral dimensions that are equal to the longitudinal dimension, it will be appreciated that the balloon chambers can be formed in other shapes, such as ellipsoids, squares, rectangles, tetrahedrons, block triangles, and other polyhedron shapes. The shared balloon chamber preferably has a larger size in its lateral and longitudinal dimensions than at least one of the balloon chambers connected to it.

It will also be appreciated that the different balloon chambers can have different sizes. As particularly shown in the drawings, there can be a balloon chamber with a large diameter and a pair of balloon chambers that are each interconnected to the large balloon chamber and which have a smaller diameter. The large balloon chamber would have a tangential connection respectively connected to each of the small balloon chambers. The tangential connections between the small balloon chambers and the large balloon chamber would be circumferentially offset from one another so they are not aligned with each other.

The gas travels into the internal space for one of the balloon chambers from outside the exterior surface through the valve and the port and into the internal space of each of the balloon chambers through each aperture in the balloon chambers and the center space in the connecting ring to produce the inflated state. Due to the location and configuration of the connection rings as described in more detail below, the gas forces the balloon chambers into an asymmetric arrangement as the balloon garland is inflated. The gas travels back through each aperture and the center space and out of the internal space for each of the balloon chambers and through the valve and the port in the first the balloon chamber to produce to the deflated state.

As evident from the drawings, there can be several pairs of balloon chambers according to the present invention. As shown in FIGS. 2A and 2B, additional balloon chambers 12*d*, 12*e* can be connected to the shared balloon chamber 12*b*. As shown in FIGS. 3A-3F, balloon chambers that are connected to the shared balloon chamber can also be an additional common balloon chamber 12*a*, 12*d* that connect even more balloon chambers 12*a*', 12*a*", 12*d*', 12*d*". Each additional pair of balloon chambers with the shared balloon chambers have the tangential connection described above, and the additional axes 30*c*, 30*d* that extend perpendicular to the plane through the corresponding tangential connection form more skew lines that aren't parallel to and don't intersect the other axes 30*a*, 30*b* when the internal space is in the inflated state.

It will be appreciated that for garlands which have large clusters of balloon chambers, such as more than a half dozen, there could be multiple valves for different groups of balloon chambers that form the larger clusters. For example, the garland shown in FIGS. 3A-3F is formed by a cluster of nine (9) balloon chambers that are all connected to each other, but a first set of four (4) balloon chambers 12*a*, 12*a*', 12*a*", 12*b* are in fluid communication with a first valve in one of the balloon chambers in this first set while a second set of five (5) balloon chambers 12*c*, 12*d*, 12*d*', 12*d*", 12*f* are in fluid communication with a second valve in one of the balloon chambers in this second set. The segmenting of larger clusters into multiple groups of smaller clusters which each have their own valve makes it easier to inflate and deflate the garlands. It will be appreciated that the segmenting of the clusters could be equal in number or could be divided based on the space of the clusters so each of the smaller clusters has a similar space. It will also be appreciated that larger garlands could be formed by more than two (2) smaller clusters.

As indicated above, the balloon chambers have a substantially planar configuration in the deflated state and a predefined asymmetric arrangement in the inflated state. In particular, each axis is offset a distance ($D_1$, $D_2$, $D_3$) from the next adjacent axis. In the deflated state, the axes are substantially parallel to each other and are substantially perpendicular to the planar configuration of the balloon chambers. This is entirely different from the axes in the prior art in which the axis of the interconnected balloon structures are parallel to the planar configuration of the balloon chambers in the deflated state. In the present invention, the gas within the internal space forces the balloon chambers into the predefined asymmetric arrangement in the inflated state without any external manipulation of the balloon chambers. In comparison, the prior art balloon chambers must be externally manipulated in order to force them into an asymmetric arrangement relative to each other.

As explained above, the connecting ring provides additional strength to the tangential connections between the pair of balloon chambers, and its center space is aligned with the apertures in the balloon chambers' corresponding panels. It will be appreciated that there could be a pair of connecting rings at each tangential connection with one connecting ring's center space aligned with the aperture in one of the balloon chambers in the pair and the other connecting ring's center space aligned with the aperture in the other of the balloon chambers in the pair. To allow the airflow between the pair of balloon chambers, the connecting rings would be aligned with each other. It will also be appreciated that one side of the aperture can include a set of flexible flaps that allow unrestricted airflow in a first direction through the aperture, such as when the balloon chambers are being inflated, and restrict airflow in a second direction through the aperture, such as when the balloon chambers are being deflated.

A fastener 22 is preferably connected to the exterior surface of at least one of the balloon chambers. The fastener protrudes a length from the exterior surface and preferably includes an eyelet 42. Preferably, the fastener is attached to one of the elongated panels so that it is circumferentially offset on the balloon chamber from the circular panel on one of the balloon chambers. It will also be appreciated that the loop formed by the valve's tether in the closed configuration can also be used as a fastener. The larger clusters of balloon chambers preferably include additional fasteners attached to the balloon chambers that are toward the middle and the ends of the clusters. The fasteners are helpful when installing the balloon garland but are not necessary for the installation or for the proper functioning of the balloon garland.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the present invention could be applied to balloon chambers with organic shapes, such as disclosed in U.S. Pat. No. 3,230,663 which is incorporated by reference. Of course, in addition to the animal shapes shown and described in the '663 Patent, any shape or combination of shapes could be used for the garland of the present invention, such as hearts, crescent moons, humanoids in various poses, etc. Thus, the breadth and scope of the present invention should not be limited by any of the above-described exemplary embodiments but should be defined only in accordance with the following claims appended hereto and their equivalents.

What is claimed is:

1. An inflatable structure for receiving a gas, comprising:

a plurality of balloon chambers comprised of a flexible gas-impervious material, wherein a first balloon chambers and a second balloon chambers are each fixedly attached to a shared balloon chamber, wherein the balloon chambers have a deflated state and an inflated state, wherein each balloon chamber comprises an exterior surface and an interior surface, and wherein the interior surface surrounds an internal space when the balloon chambers are in the inflated state and is substantially flattened without the internal space when the balloon chambers are in the deflated state;

a plurality of tangential connections between each of the plurality of balloon chambers, wherein a first tangential connection is located in a first plane between the first balloon chambers and the shared balloon chamber in the inflated state, wherein a second tangential connection is located in a second plane between the second balloon chambers and the shared balloon chamber in the inflated state, wherein each of the tangential connections comprises a heat weld connection between the flexible gas-impervious material for the attached balloon chambers and an internal fluid passageway situated within a circumference of the heat weld connection between the attached balloon chambers, wherein a section of the flexible gas-impervious material for each of the balloon chambers extends between the circumference of the heat weld connection and the internal fluid passageway in the tangential connections, wherein a first axis extends perpendicular to the first plane through the first tangential connection, and wherein a second axis extends perpendicular to the second plane through the second tangential connection;

a port in at least one of the balloon chambers, wherein the port comprises an external fluid passageway between the interior surface and the exterior surface; and a valve connected to and in fluid communication with the port, wherein the valve allows a flow of the gas through the port in an open configuration and prevents a flow of the gas through the port in a closed configuration.

2. The inflatable structure of claim 1, wherein each of the balloon chambers is comprised of a plurality of elongated panels, wherein the elongated panels extend between opposite sides of each of the balloon chambers and are sealed together at a plurality of longitudinal seams between adjacent elongated panels, wherein the elongated panels comprise end sections with terminal ends, wherein the terminal ends for each of the balloon chambers surround an open space, wherein the end sections of the elongated panels and the longitudinal seams for the first balloon chamber and the second balloon chamber are sealed in the heat weld connection and extend through the heat weld connection to the terminal ends, wherein the section of the flexible gas-impervious material within the circumference of the heat weld connection for the first balloon chamber and the second balloon chamber is comprised of the terminal ends of the elongated panels, and wherein the internal fluid passageway allows an unencumbered airflow between the respective internal spaces in each of the balloon chambers.

3. The inflatable structure of claim 2, wherein the section of the flexible gas-impervious material within the circumference of the heat weld connection for the shared balloon chamber is comprised of either the terminal ends of the elongated panels or a section of the elongated panels between the end sections.

4. The inflatable structure of claim 3, wherein the internal fluid passageway in the first tangential connection and the second tangential connection is respectively formed by the open space in the first balloon chamber and the second balloon chamber in alignment with either the open space in the shared balloon chamber or a hole cut in the section of the elongated panels between the end sections in the shared balloon chamber.

5. The inflatable structure of claim 2, further comprising a third balloon chambers, wherein a third tangential connection is located in a third plane between the third balloon chambers and one of the first balloon chamber, the second balloon chamber, and the shared balloon chamber, and wherein a third axis extends perpendicular to the third plane through the third tangential connection.

6. The inflatable structure of claim 5, wherein the balloon chambers have a substantially planar configuration in the deflated state and a predefined asymmetric arrangement in the inflated state, wherein the first axis and the second axis form skew lines that do not intersect and are not parallel when the balloon chambers are in the inflated state, wherein the third axis forms another skew line that isn't parallel to and doesn't intersect the first axis and the second axis when the internal space is in the inflated state, wherein the first axis is offset a first distance from the second axis, wherein the second axis is offset a second distance from the third axis, wherein the first axis, the second axis, and the third axis are substantially parallel to each other and are substantially perpendicular to the planar configuration of the balloon chambers in the deflated state, and wherein the gas within the internal space forces the balloon chambers into the predefined asymmetric arrangement in the inflated state without any external manipulation of the balloon chambers.

7. The inflatable structure of claim 2, further comprising an end panel and a fastener, wherein the end panel is heat welded to the end sections of the elongated panels for the shared balloon chamber at one of the opposite sides and seals the open space within the terminal ends, wherein the fastener is connected to the exterior surface of at least one of the balloon chambers, wherein the fastener protrudes a length from the exterior surface and further comprises an eyelet, and wherein the fastener is circumferentially offset from the valve.

8. The inflatable structure of claim 2, further comprising a first end panel and a second end panel, wherein the first end panel is heat welded to the end sections of the elongated panels for the first balloon chamber opposite from the first tangential connection with the shared balloon chamber, wherein the second end panel is heat welded to the end sections of the elongated panels for the second balloon chamber opposite from the second tangential connection with the shared balloon chamber, wherein first end panel seals the open space within the terminal ends of the first balloon chamber opposite from the first tangential connection with the shared balloon chamber, and wherein second end panel seals the open space within the terminal ends of the second balloon chamber opposite from the second tangential connection with the shared balloon chamber.

9. The inflatable structure of claim 1, wherein the first tangential connection and the second tangential connection each further comprises a direct attachment in the flexible gas-impervious material between the shared balloon chamber and the first balloon chamber and the second balloon chamber, respectively, wherein the direct attachment is a fixed orientation for each of the first tangential connections without any tube or other extension between the balloon chambers.

10. The inflatable structure of claim 9, further comprising a planar connecting ring fastening together the exterior surface of the shared balloon chambers and the first balloon chamber at the first tangential connection-between-the-airs-of-balloon chambers, wherein the internal fluid passageway is located within a center space in the planar connecting ring.

11. An inflatable structure for receiving a gas, comprising:

a plurality of balloon chambers, wherein a first balloon chamber and a second balloon chamber are each fixedly attached to a shared balloon chamber and each of the balloon chambers is comprised of a plurality of elongated panels formed from a flexible gas-impervious material, wherein the elongated panels extend between a first side and a second side of each of the balloon chambers and are sealed together at a plurality of longitudinal seams between adjacent elongated panels, wherein the elongated panels extend to terminal ends at the first side and the second side, wherein the terminal ends of the elongated panels surround a first open space at the first side and a second open space at the second side, wherein the first balloon chamber is further comprised of a first end panel, wherein the second balloon chamber is further comprised of a second end panel, and wherein the first end panel and the second end panel seal the terminal ends of the elongated panels around the first open space at the first side of the first balloon chamber and the second balloon chamber, respectively;

a plurality of tangential connections between the balloon chambers, wherein a first tangential connection attaches the first balloon chamber to the shared balloon chamber, wherein a second tangential connection attaches the second balloon chamber to the shared balloon chamber, wherein each of the tangential connections comprises a direct connection between the flexible gas-impervious material for the attached balloon chambers and an internal fluid passageway within a circumference of the tangential connections between the attached balloon chambers, wherein the direct connection between the flexible gas-impervious material for each of the tangential connections is in a fixed orientation without any tube or other extension between the balloon chambers, wherein the terminal ends of the elongated panels in the first balloon chamber and the second balloon chamber extend from the circumference of the tangential connections to the second open space at the second side, and wherein a first hole is formed in at least one of the elongated panels of the shared balloon chamber and is aligned with the second open space of the first balloon chamber within the circumference of the first tangential connection to produce the internal fluid passageway between the first balloon chamber and the shared balloon chamber;

a port in at least one of the balloon chambers, wherein the port comprises an external fluid passageway between the interior surface and the exterior surface; and a valve connected to and in fluid communication with the port, wherein the valve allows a flow of the gas through the port in an open configuration and prevents a flow of the gas through the port in a closed configuration.

12. The inflatable structure of claim 11, wherein the second open space surrounded by the terminal ends of the elongated panels in the second side of the second balloon chamber is aligned with either a second hole in at least one of the elongated panels of the shared balloon chamber or with the second open space in the second side of the shared balloon chamber to form the internal fluid passageway for the second tangential connection between second balloon chamber and the shared balloon chamber.

13. The inflatable structure of claim 12, wherein either a third end panel or a panel containing the port surrounds and seals the first open space at the first side of the shared balloon chamber.

14. The inflatable structure of claim 13, wherein the plurality of the seams extend through the circumference of the tangential connections.

15. The inflatable structure of claim 13, wherein the direct connection between the flexible gas-impervious material for each of the tangential connections is a heat weld connection in the flexible gas-impervious material for the attached balloon chambers, wherein the first end panel is heat welded to the end sections of the elongated panels for the first balloon chamber opposite from the first tangential connection with the shared balloon chamber, and wherein the second end panel is heat welded to the end sections of the elongated panels for the second balloon chamber opposite from the second tangential connection with the shared balloon chamber.

16. An inflatable structure for receiving a gas, comprising:

a plurality of balloon chambers, wherein a first balloon chamber and a second balloon chamber are each fixedly attached to a shared balloon chamber and each of the balloon chambers is comprised of a plurality of elongated panels formed from a flexible gas-impervious material, wherein the elongated panels extend between a first side and a second side of each of the balloon chambers and are sealed together at a plurality of longitudinal seams between adjacent elongated panels, wherein the elongated panels extend to terminal ends at the first side and the second side, wherein the terminal ends of the elongated panels surround a first open space at the first side and a second open space at the second side, wherein the first balloon chamber is further comprised of a first end panel, wherein the second balloon chamber is further comprised of a second end panel, and wherein the first end panel and the second end panel seal the terminal ends of the elongated panels around the first open space at the first side of the first balloon chamber and the second balloon chamber, respectively;

a plurality of tangential connections between the balloon chambers, wherein a first tangential connection attaches the first balloon chamber to the shared balloon chamber, wherein a second tangential connection attaches the second balloon chamber to the shared balloon chamber, wherein each of the tangential connections is comprised of a heat weld connection between the flexible gas-impervious material for the attached balloon chambers and an internal fluid passageway within a circumference of the heat weld connection between the attached balloon chambers, wherein each of the tangential connections is in a fixed orientation without any tube or other extension between the balloon chambers, wherein the plurality of the seams extend through the circumference of the tangential connections, wherein the terminal ends of the elongated panels in the first balloon chamber and the second balloon chamber extend from the circumference of the tangential connections to the second open space at the second side, and wherein a first hole is formed in at least one of the elongated panels of the shared balloon chamber and is aligned with the second open space of the first balloon chamber within the circumference of the first tangential connection to produce the internal fluid passageway between the first balloon chamber and the shared balloon chamber;

a port in at least one of the balloon chambers, wherein the port comprises an external fluid passageway between the interior surface and the exterior surface; and a valve connected to and in fluid communication with the port, wherein the valve allows a flow of the gas through the port in an open configuration and prevents a flow of the gas through the port in a closed configuration.

17. The inflatable structure of claim 16, wherein the second open space surrounded by the terminal ends of the elongated panels in the second side of the second balloon chamber is aligned with either a second hole in at least one of the elongated panels of the shared balloon chamber or with the second open space in the second side of the shared balloon chamber to form the internal fluid passageway for the second tangential connection between second balloon chamber and the shared balloon chamber.

18. The inflatable structure of claim 17, wherein either a third end panel or a panel containing the port surrounds and seals the first open space at the first side of the shared balloon chamber.

19. The inflatable structure of claim 17, further comprising a third balloon chamber and a third tangential connection between the third balloon chamber and one of the first balloon chamber, the second balloon chamber, and the shared balloon chamber.

20. The inflatable structure of claim 16, further comprising a planar connecting ring fastening together the exterior surface of the shared balloon chamber and the second balloon chamber at the second tangential connection, wherein the internal fluid passageway is located within a center space in the planar connecting ring.

* * * * *